United States Patent [19]

Lewis et al.

[11] Patent Number: 4,539,568

[45] Date of Patent: Sep. 3, 1985

[54] HOT MELT INK JET HAVING NON-SPILL RESERVOIR

[75] Inventors: Arthur M. Lewis; Aldo Scudo, both of Ridgefield, Conn.

[73] Assignee: Exxon Research and Engineering Co., Florham Park, N.J.

[21] Appl. No.: 660,539

[22] Filed: Oct. 15, 1984

[51] Int. Cl.[3] .......... G01D 15/18

[52] U.S. Cl. .......... 346/1.1; 346/140 R; 400/126; 137/341; 137/592

[58] Field of Search .......... 346/140 PD, 140 IJ, 346/140 R, 75, 1.1; 400/126; 137/590, 592, 341; 222/111, 146 HE, 579; 221/288; 220/DIG. 5; 106/30-31

[56] References Cited

U.S. PATENT DOCUMENTS

| | | | |
|---|---|---|---|
| 2,237,791 | 4/1941 | Pastor | 222/579 |
| 3,653,932 | 4/1972 | Berry et al. | 346/140 PD X |
| 4,390,369 | 6/1983 | Merritt et al. | 106/31 |
| 4,490,731 | 12/1984 | Vaught | 346/140 R |
| 4,491,433 | 1/1985 | Shiurila et al. | 346/140 R X |

FOREIGN PATENT DOCUMENTS

| | | | |
|---|---|---|---|
| 0097823 | 1/1984 | European Pat. Off. | |
| 56-40565 | 4/1981 | Japan | 400/126 |

*Primary Examiner*—Thomas H. Tarcza

*Assistant Examiner*—Fred L. Kampe

[57] ABSTRACT

Ink jet apparatus for utilizing hot melt ink is provided, comprising a printing head and a reservoir for holding a supply of hot melt ink, the reservoir having a normally open port or fill tube with an end face residing within the volume of the reservoir, the end face being located at about the volumetric center of the reservoir. The reservoir is maintained with an ink volume of no more than about half of the reservoir volume, so that ink can not spill through the normally open port when the apparatus is tilted.

10 Claims, 3 Drawing Figures

HOT MELT INK JET HAVING NON-SPILL RESERVOIR

BACKGROUND OF THE INVENTION

This invention relates to ink jet apparatus for ejection of ink droplets, and more particularly, to an ink jet apparatus having a normally vented reservoir with a non-spill configuration.

The use of hot melt ink in ink jet systems, which ink is normally in a solid or frozen state but attains a liquid state or phase when its temperature is raised, has presented a number of advantages to ink jet apparatus. For a discussion of the characteristics of such ink and use thereof in ink jet apparatus, reference is made to U.S. Pat. No. 4,390,369 and pending U.S. patent applications Ser. No. 610,627 filed May 16, 1984, Ser. No. 565,124 filed Dec. 23, 1983, and Ser. No. 644,542 filed Aug. 27, 1984, all assigned to the same assignee as this invention and incorporated herein by reference.

While the use of hot melt ink has presented advantages as discussed in the above references, it also creates additional requirements for the design of the apparatus in which it is used. Since the ink supply is replenished by dropping or injection of pellets into the apparatus, the reservoir needs to have a normally open port through which the ink enters when it is first received and melted. Although the apparatus may be capped with a cover or lid in order to protect the reservoir from infusion of dirt or other contaminants, it is difficult to achieve a leak proof reservoir housing which can prevent leaking or spillage when tilted or jarred by external forces. The apparatus must allow ready access for the addition of the solid ink pellets, with the result that it is difficult to provide the required integrity against spilling or leaking of liquid ink from the reservoir.

A loss of ink due to spillage or leaking is a severe problem for any ink jet apparatus, since voiding the ink jet head of ink can result in rendering the apparatus totally inoperable. This is normally not a severe problem in ink jet apparatus employing standard single phase liquid ink, since conventional arrangements provide for sealing of the ink within the apparatus. However, these conventional sealing arrangements are not applicable to the hot melt ink application where replenishment is accomplished by insertion of a pellet or pellets of ink into the apparatus, followed by heating of the pellet to transform it to the liquid phase.

SUMMARY OF THE INVENTION

It is an object of this invention to provide an ink jet apparatus adapted to utilize hot melt ink which has a non-spill ink reservoir, thereby protecting the apparatus from loss of ink when it is tilted or jarred.

It is another object of this invention to provide ink jet apparatus which utilizes hot melt ink and which provides ready access for replenishment of ink by introduction of pellets thereto without sacrificing the integrity of the reservoir with respect to spillage.

It is another object of this invention to provide a method of operating an ink jet apparatus utilizing hot melt ink, which method ensures against spillage of ink from the apparatus.

In accordance with the above and other objects, a preferred embodiment of the apparatus of this invention comprises a printing head and a reservoir for supplying melted ink to the printing head, the reservoir having a normally open port with an inner port face positioned within the reservoir at substantially its volumetric center. A capillary feed tube is provided for feeding ink from the reservoir to the print head.

DETAILED DESCRIPTION OF THE PREFERRED EMBODIMENTS

Figure 1:
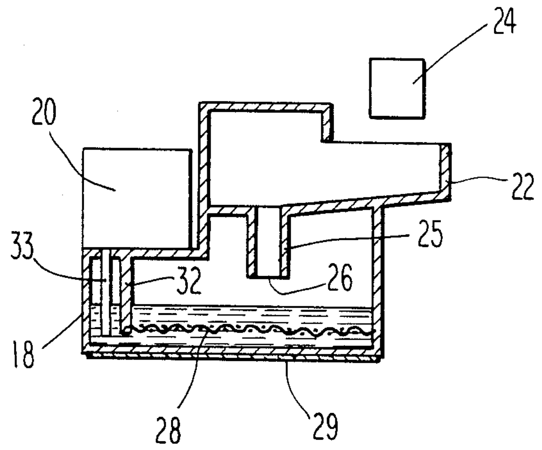
FIG. 1 is a side schematic view of the ink jet apparatus according to this invention.
Figure 2:
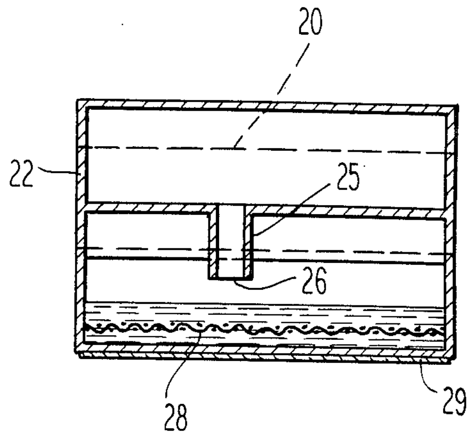
FIG. 2 is a diagrammatic sectional view looking toward the front of the apparatus of FIG. 1.

Referring to FIGS. 1 and 2, the apparatus comprises a housing 18 defining therein a reservoir for holding hot melt ink, and a print head 20 shown in block form mounted integrally thereon. The print head, or ink jet head 20 comprises the necessary elements for controlled ink droplet ejection, as is known in the art. Reference is made to copending application Ser. No. 604,128, filed Apr. 26, 1984, titled AN INK JET APPARATUS AND METHOD OF MAKING THE APPARATUS, assigned to the same assignee. This reference discloses details of the structure of an ink jet head, and is incorporated herein by reference.

Mounted on the top of the reservoir housing is a pellet receiving structure 22 for receiving a pellet as illustrated at 24. Element 22 may be in thermal connection with heater 29 located under the bottom of the reservoir, or any other conveniently located heating source, for melting the pellet when it is received. The pellet need not be melted before going into the reservoir. In an alternative mode solid pellets may be entered or inserted through port 25 and be melted inside the reservoir. It is to be understood that any convenient pellet entering mechanism or means may be utilized within the scope of this invention.

The melted ink from the pellet flows down the sloped floor surface of element 22 and enters the reservoir defined by housing 18 through a port, or fill tube 25. Port 25 has an inner end, or face 26, through which the melted ink drops into the reservoir. Although valve means such as illustrated in copending case Ser. No. 661,925 filed Oct. 17, 1984, may be utilized for closing the port 25 under depriming or other conditions, a characteristic of port 25 is that it is normally open. In addition to providing access of the ink into the reservoir, port or fill tube 25 acts as a vent to atmospheric pressure.

Still referring to FIGS. 1 and 2, a filter shown diagrammatically at 28 is maintained above the floor of the reservoir, for filtering out unwanted particles and contaminants in the ink. The volume of ink in the reservoir may comprise a portion below the filter 28, as well as a portion above, as specifically illustrated in FIGS. 1 and 2. A baffle 32 in mechanical connection with the filter 28 divides the reservoir into volume portions which are respectively before and after the filter, i.e., pre-filter and post-filter volumes. A feed tube 33 is positioned to feed ink from the post-filter volume to the ink jet head 20 for use in operation of the device.

Figure 3:
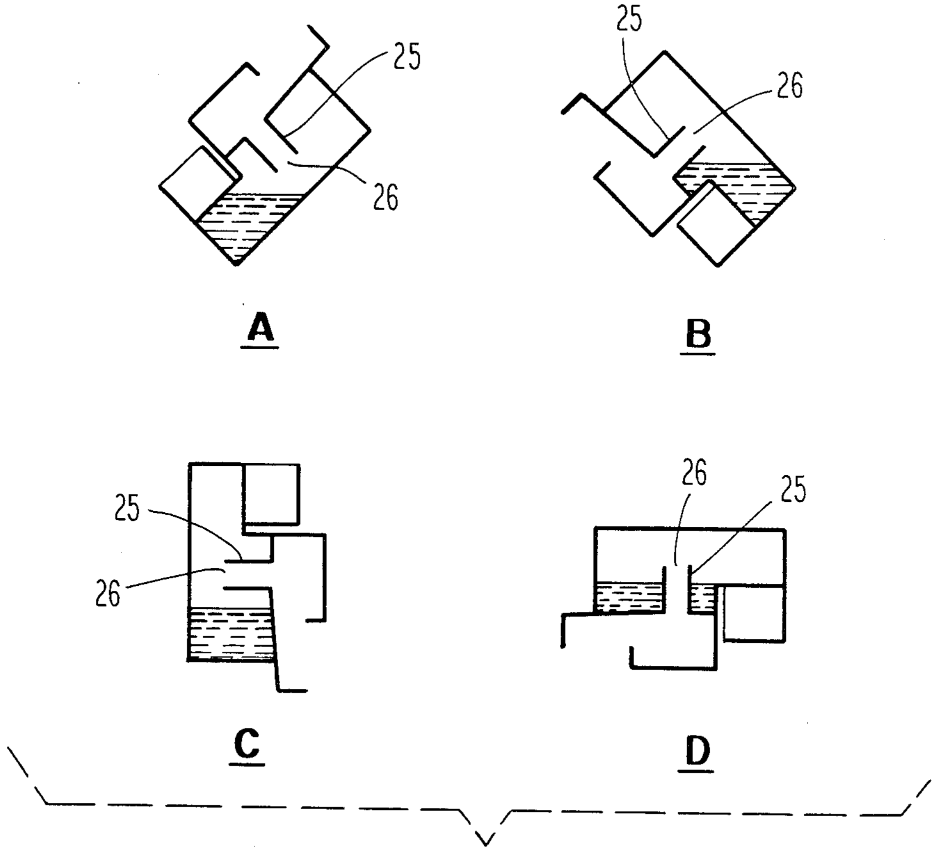
FIG. 3 shows diagrammatic sectional views A–D of the reservoir in accordance with the principles of this invention at different degrees of tilt, to illustrate the non-spill characteristic of the invention design.

The port 25 is normally in an open condition. In this invention spillage of liquid ink from the machine when it is tilted is prevented by extending port 25 into the interior of the reservoir to a point such that the face 26 is substantially at the geometric, i.e., volumetric center of the reservoir. This feature is combined with maintenance of the ink level such that the ink does not reach the face 26 no matter what the tilt of the reservoir. This requirement thus specifies that the volume of ink in the reservoir never exceeds one half the total volume of the reservoir, including both the pre-filter and post-filter volumes. For example, it is preferred to have a maximum of about 20 cc of ink in the reservoir, meaning that the total reservoir volume must be greater than about 40 cc. As illustrated in A–D of FIG. 3, no matter what the tilt of the reservoir from its normal position, from 0°–360° the top surface of the ink in the reservoir does not reach face 26, and thus cannot spill out of the reservoir.

In practice, a level detector such as illustrated in the copending application Ser. No. 661,925, filed Oct. 17, 1984, which is assigned to the assignee of this invention and is incorporated by reference, is utilized to determine both when ink should be added, and whether ink has approached the level at which it reaches the face 26. Preferably, the level detector provides a signal when the ink is up to a predetermined level short of the port face, so as to provide a margin of safety. The apparatus also suitably includes a tilt switch located in head 20 or elsewhere on the apparatus which electrically disables the apparatus under conditions where it is tilted beyond a predetermined angle, for redundant safety purposes.

In order to avoid entry of air into the head 20 with consequent depriming upon tilting of the apparatus, the inlet 33 is terminated in a small space of capillary dimensions, so as to prevent the ink from draining away from the inlet and admitting air thereto when the apparatus is tilted. The space between the outside housing 18 and baffle element 32 is sized with respect to the diameter of feed tube 33 as to produce a capillary draw of ink, so as to maintain some ink around the inlet end of tube 33. A sump (not shown) is preferably located in the reservoir floor below tube 33, to further aid in maintaining ink around the feed tube end. These features, in addition to the automatic shut off of the printer upon tilting, ensure against depriming of the print head.

Although the apparatus of this invention has been illustrated with a reservoir of relatively simple geometric design, it is to be understood that the figures are exemplary of the principle of placing the feed tube face at the volumetric center. In practice, and as illustrated in referenced application Ser. No. 661,925, the reservoir has a complex shape, including a sump portion in the reservoir floor. All portions of the volume of the reservoir must be taken into account in determining the volumetric center, regardless of interposed elements such as baffles, filters and the like.

Other embodiments and modifications will occur to those of ordinary skill in the art which fall within the true spirit and scope of the invention as set forth in the appended claims.

We claim:

1. An ink jet apparatus utilizing hot melt ink, comprising a printing head, a heat conductive reservoir for holding a supply of ink, heating means in thermal connection with said reservoir for heating said supply of ink to maintain it in a melted phase, and outlet means for providing an outlet feed of said melted ink to said printing head, characterized by said reservoir having a normally open port with a port face in the interior of said reservoir, said port face being positioned at substantially the volumetric center of said reservoir.

2. The ink jet apparatus of claim 1, wherein said port comprises ink entry means for entering ink into said reservoir.

3. The ink jet apparatus of claim 2, comprising pellet receiving means mounted on said reservoir for receiving an ink pellet.

4. The ink jet apparatus of claim 3, wherein said printing head further comprises a tilt sensor and means for disabling operation of said print head when a tilt greater than a predetermined angle is sensed.

5. The ink jet apparatus of claim 1, wherein said outlet means is further characterized by capillary means for providing capillary draw of ink around the lower end thereof.

6. The ink jet apparatus of claim 3, wherein said pellet receiving means is in thermal connection with said reservoir and has means for directing melted ink in through said port.

7. A method of operating an ink jet apparatus, said apparatus utilizing hot melt ink and having a print head in combination with a reservoir for supplying ink to said print head, the reservoir having a port which extends into said reservoir and has a face within said reservoir, comprising;

providing ink to said apparatus in an initial solid form,
heating said ink to transform it to its melt phase,
maintaining said ink in said reservoir in its melted phase,
normally venting said reservoir through said port,
passing ink from said reservoir to said print head, and
positioning said port face at about the volumetric center of said reservoir and maintaining the volume of ink in said reservoir at no more than about half of the volume of said reservoir.

8. The method of claim 7, comprising sensing the tilt of said apparatus, and automatically disabling operation of said print head when the sensed tilt exceeds a predetermined angle.

9. The method of claim 7, wherein said providing step comprises entering ink in pellet form directly through said port.

10. The method of claim 7, wherein said providing step comprises first melting said ink and then entering it through said port into said reservoir.

* * * * *